US011486442B2

(12) United States Patent
Chen et al.

(10) Patent No.: US 11,486,442 B2
(45) Date of Patent: Nov. 1, 2022

(54) SLIDE RAIL ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shun-Ho Yang, Kaohsiung (TW); Chi-Chih Chou, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 49 days.

(21) Appl. No.: 17/110,639

(22) Filed: Dec. 3, 2020

(65) Prior Publication Data
US 2022/0065292 A1     Mar. 3, 2022

(30) Foreign Application Priority Data
Aug. 28, 2020 (TW) .................. 109129821

(51) Int. Cl.
| | |
|---|---|
| *F16C 29/04* | (2006.01) |
| *A47B 88/423* | (2017.01) |
| *A47B 88/473* | (2017.01) |
| *A47B 88/487* | (2017.01) |
| *A47B 88/44* | (2017.01) |

(52) U.S. Cl.
CPC ............ *F16C 29/04* (2013.01); *A47B 88/423* (2017.01); *A47B 88/44* (2017.01); *A47B 88/473* (2017.01); *A47B 88/487* (2017.01); *A47B 2088/4235* (2017.01)

(58) Field of Classification Search
CPC ....... A47B 88/40; A47B 88/44; A47B 88/443; A47B 88/447
See application file for complete search history.

(56) References Cited

U.S. PATENT DOCUMENTS

| | | | | |
|---|---|---|---|---|
| 6,935,710 | B2 * | 8/2005 | Chen ................... | A47B 88/487 |
| | | | | 312/334.44 |
| 9,854,909 | B1 | 1/2018 | Chiu | |
| 10,743,658 | B1 * | 8/2020 | Chen ................... | A47B 88/443 |
| 10,806,255 | B1 * | 10/2020 | Chen ................... | A47B 88/443 |

(Continued)

FOREIGN PATENT DOCUMENTS

| | | | | |
|---|---|---|---|---|
| EP | 3505010 | A1 | 7/2019 | |
| EP | 3808215 | A1 * | 4/2021 | ............. A47B 88/44 |

(Continued)

*Primary Examiner* — Daniel J Rohrhoff
(74) *Attorney, Agent, or Firm* — Rosenberg, Klein & Lee

(57) ABSTRACT

A slide rail assembly includes a first rail, a second rail, a blocking feature, and a component. The two rails can be displaced with respect to each other. The blocking feature is provided at one of the two rails, and the component at the other of the two rails. When the second rail is at a predetermined position with respect to the first rail, a blocking portion of the blocking feature and a predetermined portion of the component are blocked by each other to prevent the second rail from being displaced with respect to the first rail from the predetermined position in a predetermined direction. One of the blocking portion and the predetermined portion forms a non-vertical structure.

19 Claims, 12 Drawing Sheets

(56) References Cited

U.S. PATENT DOCUMENTS

| | | | |
|---|---|---|---|
| 10,888,158 B1* | 1/2021 | Chen | A47B 88/473 |
| 2019/0159593 A1* | 5/2019 | Chen | A47B 88/40 |
| 2019/0200756 A1* | 7/2019 | Chen | H05K 7/1489 |

FOREIGN PATENT DOCUMENTS

| | | | | |
|---|---|---|---|---|
| EP | 3821761 A1 * | 5/2021 | ........... | A47B 88/443 |
| TW | 201538107 A | 10/2015 | | |

* cited by examiner

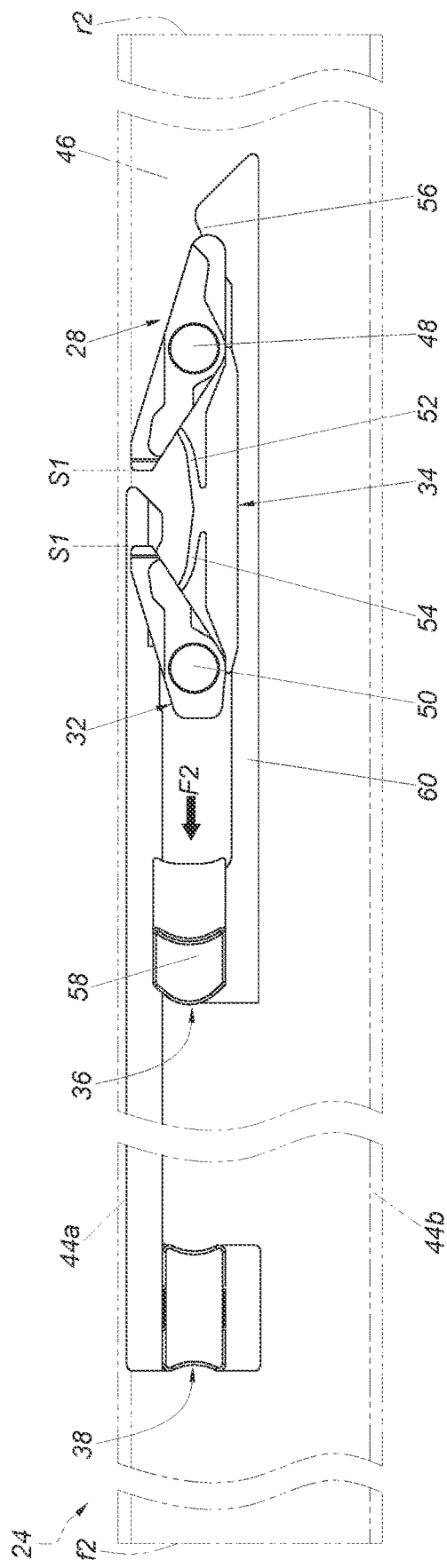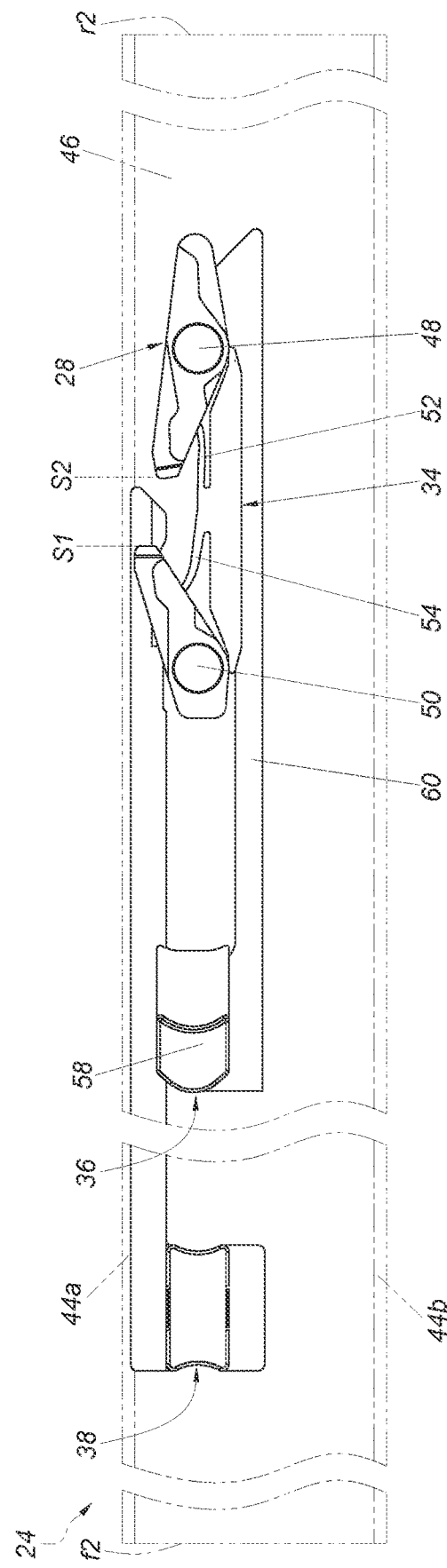

SLIDE RAIL ASSEMBLY

FIELD OF THE INVENTION

The present invention relates to a slide rail and more particularly to a slide rail assembly that can ensure the reliability of two slide rails thereof when the two slide rails are at a predetermined position with respect to each other.

BACKGROUND OF THE INVENTION

U.S. Pat. No. 6,935,710 B2 discloses a two-way retainer for a slide track assembly of drawers. The two-way retainer includes a retaining mechanism provided on a first slide track and a stop member provided on a second slide track. The retaining mechanism is provided at least with two retaining arms and an elastic member adapted to bias the retaining arms. The two retaining arms are respectively provided with a pair of oppositely inclined surfaces and a pair of first engaging portions. The stop member is provided with a stop portion. When the first slide track is pulled forward to a predetermined operation position, the stop portion of the stop member on the second slide track may pass through the inclined surface of one of the retaining arms of the first slide tack and end up engaged between the first engaging portions of the two retaining arms to produce a two-way retaining effect.

More specifically, when the first slide track is at an extended position with respect to the second slide track as shown in FIG. 4 of the aforesaid patent, the first engaging portions of the two retaining arms are respectively pressed against the two opposite lateral sides of the stop portion of the stop member to produce the two-way retaining effect. Also, it can be seen in FIG. 1 of the aforesaid patent that the stop portion is a protrusion protruding transversely and perpendicularly with respect to the stop member (or with respect to the longitudinal wall or length direction of the second slide track) such that the two opposite lateral sides of the stop portion are vertical structures. If, therefore, the transverse depth to which the first engaging portions of the two retaining arms are respectively pressed against the two opposite lateral sides of the stop portion (i.e., the transvers depth to which the first engaging portion of each retaining arm and the corresponding lateral side of the stop portion are blocked by each other) is insufficient, the first slide track may move away from the extended position with respect to the second slide track.

As the market has more and more stringent requirements on the reliability or safety of slide rail assemblies during use, it is worthwhile to develop a slide rail product different from the foregoing.

SUMMARY OF THE INVENTION

The present invention relates to a slide rail assembly that can ensure the reliability of two slide rails thereof when the two slide rails are at a predetermined position with respect to each other.

According to one aspect of the present invention, a slide rail assembly includes a first rail, a second rail, a blocking feature, and a first component. The first rail and the second rail can be displaced with respect to each other in a longitudinal direction. The blocking feature is provided at one of the first rail and the second rail, and the first component at the other of the first rail and the second rail. When the second rail is at a predetermined position with respect to the first rail, a first blocking portion of the blocking feature and a first predetermined portion of the first component are blocked by each other to prevent the second rail from being displaced with respect to the first rail from the predetermined position in a first direction. The first blocking portion of the blocking feature forms a first non-vertical structure in a transverse direction. The blocking feature has a high section and a low section. The high section has a first longitudinal length substantially greater than a second longitudinal length of the low section such that a first engaging space is formed. The first predetermined portion of the first component enters the first engaging space when the second rail reaches the predetermined position with respect to the first rail; as a result, the first blocking portion of the blocking feature and the first predetermined portion of the first component are blocked by each other in the transverse direction, ensuring that the second rail cannot be moved away from the predetermined position with respect to the first rail in the first direction.

Preferably, the first blocking portion is located between the low section and the high section, and the high section and the low section are so arranged that the first blocking portion has a first inclination angle and forms the first non-vertical structure.

Preferably, the blocking feature further has a second blocking portion and forms a second engaging space. The second blocking portion forms a second non-vertical structure, and the second blocking portion and the first blocking portion are located at two ends of the blocking feature respectively.

Preferably, the second blocking portion is located between the low section and the high section, and the high section and the low section are so arranged that the second blocking portion has a second inclination angle and forms the second non-vertical structure.

Preferably, the second inclination angle is substantially the same as the first inclination angle.

Preferably, the one of the first rail and the second rail includes a first wall, a second wall, and a longitudinal wall connected between the first wall and the second wall, and the blocking feature protrudes with respect to the longitudinal wall substantially in the transverse direction such that the high section of the blocking feature has a transverse height with respect to the low section.

Preferably, the first component has two opposite sides, namely a first side and a second side, and a first stepped structure is provided between the first side and the second side of the first component and has a first step and a second step connected to the first step of the first stepped structure. The first predetermined portion of the first component is located at the second step of the first stepped structure. The second step of the first stepped structure has a low portion and a high portion. The first predetermined portion is located between the low portion and the high portion of the second step of the first stepped structure, and the high portion and the low portion of the second step of the first stepped structure are so arranged that the first predetermined portion has a third inclination angle and forms another first non-vertical structure.

Preferably, the low portion and the high portion of the second step define a transverse thickness therebetween, and the transverse thickness is smaller than the transverse height.

Preferably, the slide rail assembly further includes a second component provided at the other of the first rail and the second rail. When the second rail is at the predetermined position with respect to the first rail, the second blocking portion of the blocking feature and a second predetermined portion of the second component are blocked by each other in the longitudinal direction to prevent the second rail from being displaced with respect to the first rail from the predetermined position in a second direction, which is the opposite direction of the first direction. Moreover, the second predetermined portion of the second component enters the second engaging space when the second rail reaches the predetermined position with respect to the first rail; as a result, the second blocking portion of the blocking feature and the second predetermined portion of the second component are blocked by each other in the transverse direction, ensuring that the second rail cannot be moved away from the predetermined position with respect to the first rail in the second direction.

Preferably, the second component has two opposite sides, namely a first side and a second side, and a second stepped structure is provided between the first side and the second side of the second component and has a first step and a second step connected to the first step of the second stepped structure. The second predetermined portion of the second component is located at the second step of the second stepped structure. The second step of the second stepped structure has a low portion and a high portion. The second predetermined portion is located between the low portion and the high portion of the second step of the second stepped structure, and the high portion and the low portion of the second step of the second stepped structure are so arranged that the second predetermined portion has a fourth inclination angle and forms another second non-vertical structure.

Preferably, the first component is movably mounted on the other of the first rail and the second rail.

Preferably, the second component is movably mounted on the other of the first rail and the second rail.

Preferably, when the first component and the second component are in a first state, the first predetermined portion of the first component and the second predetermined portion of the second component are respectively blocked by the first blocking portion and the second blocking portion of the blocking feature to prevent the second rail from being displaced with respect to the first rail from the predetermined position in the second direction as well as in the first direction.

Preferably, once the first component and the second component are operated and thereby brought into a second state, the first predetermined portion of the first component and the second predetermined portion of the second component are no longer respectively blocked by the first blocking portion and the second blocking portion of the blocking feature, and the second rail is therefore allowed to be displaced with respect to the first rail from the predetermined position in the second direction as well as in the first direction.

Preferably, the slide rail assembly further includes an elastic member and at least one operation member. The elastic member includes an elastic section for applying an elastic force to one of the first component and the second component and thereby keeping the one of the first component and the second component in the first state. The at least one operation member is configured to drive the one of the first component and the second component into motion and thereby bring the one of the first component and the second component from the first state into the second state.

Preferably, the at least one operation member includes a first operation member and a second operation member. The first operation member is adjacent to a middle rail section of the second rail, and the second operation member is adjacent to a front rail section of the second rail.

Preferably, the first operation member includes a first driving portion matching a first actuating portion of the first component, and the second operation member includes a second driving portion matching a second actuating portion of the second component. The second driving portion has two driving parts, namely a front driving part and a rear driving part, and the second actuating portion has two contact parts so that the second driving portion can drive the second actuating portion into displacement whether the second driving portion is displaced forward or rearward.

According to another aspect of the present invention, a slide rail assembly includes a first rail, a second rail, a blocking feature, and a component. The first rail and the second rail can be displaced with respect to each other in a longitudinal direction. The blocking feature is provided at the first rail while the component is provided at the second rail. When the second rail is at a predetermined position with respect to the first rail, a blocking portion of the blocking feature and a predetermined portion of the component are blocked by each other in the longitudinal direction to prevent the second rail from being displaced with respect to the first rail from the predetermined position in a predetermined direction. Each of the first rail and the second rail includes a first wall, a second wall, and a longitudinal wall connected between the first wall and the second wall. The blocking feature protrudes with respect to the longitudinal wall of the first rail substantially in a transverse direction such that a high section of the blocking feature has a transverse height with respect to a low section of the blocking feature. The high section has a first longitudinal length substantially greater than a second longitudinal length of the low section. The component has two opposite sides, namely a first side and a second side, and a stepped structure is provided between the first side and the second side of the component and has a first step and a second step connected to the first step. The predetermined portion of the component is located at the second step. A low portion and a high portion of the second step define a transverse thickness therebetween, and the transverse thickness is smaller than the transverse height.

Preferably, the blocking portion of the blocking feature forms a non-vertical structure in the transverse direction to help enhance the reliability of the mutual blockage between the blocking portion of the blocking feature and the predetermined portion of the component.

Preferably, the blocking portion is located between the low section and the high section, and the high section and the low section are so arranged that the blocking portion has an inclination angle and forms the non-vertical structure.

BRIEF DESCRIPTION OF THE DRAWINGS

FIG. 3A is an enlarged view of the two components according to the embodiment of the present invention;

FIG. 8 is a schematic view showing that the two components on the second rail are not operated and are therefore in the first state according to the embodiment of the present invention;

FIG. 9 is a schematic view showing that a different one of the two components has been operated and is now in the second state according to the embodiment of the present invention;

DETAILED DESCRIPTION OF THE INVENTION

Figure 1:
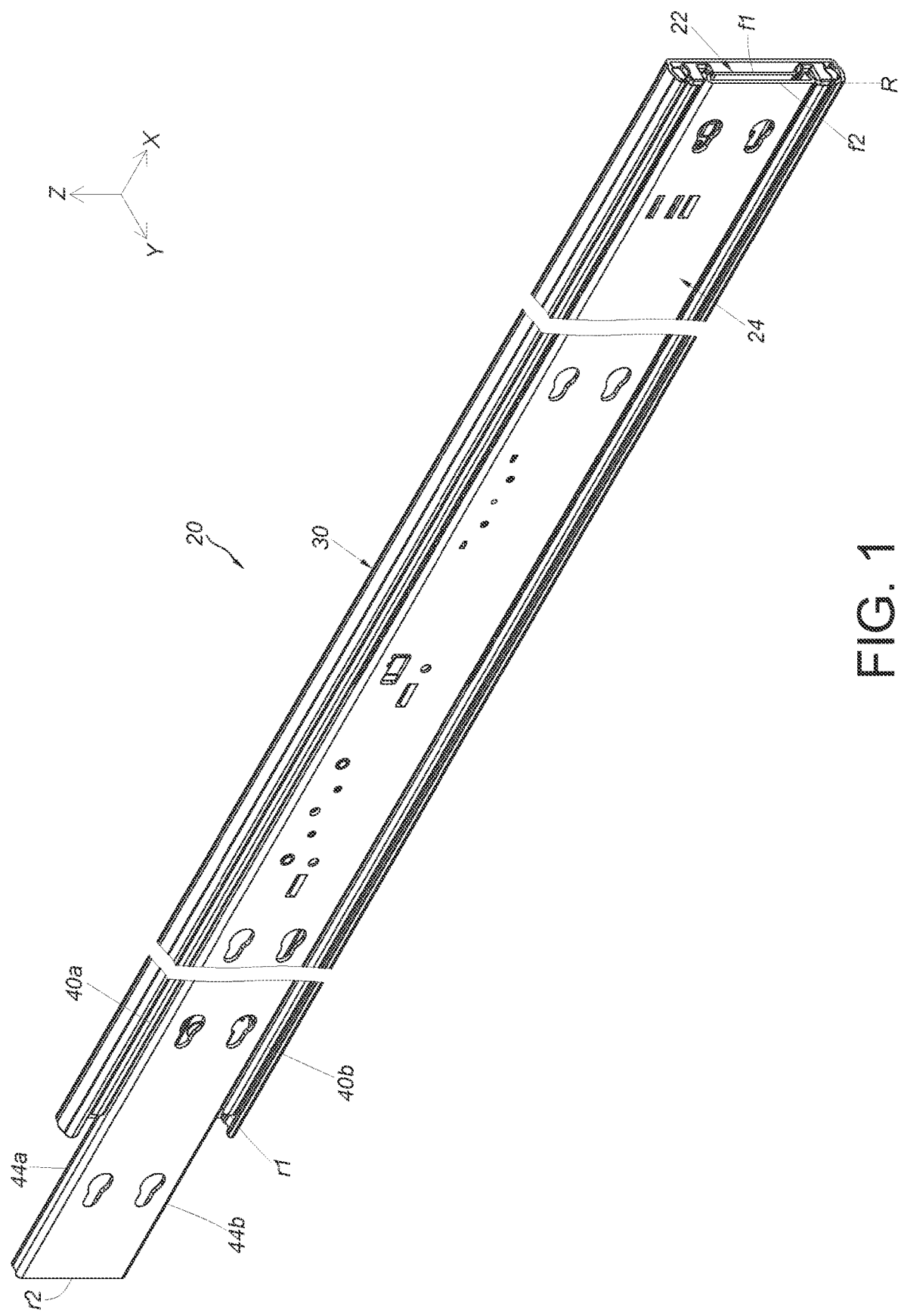
FIG. 1 is an assembled perspective view of the slide rail assembly according to an embodiment of the present invention, wherein the slide rail assembly includes a first rail, a second rail, and a third rail.
Figure 2:
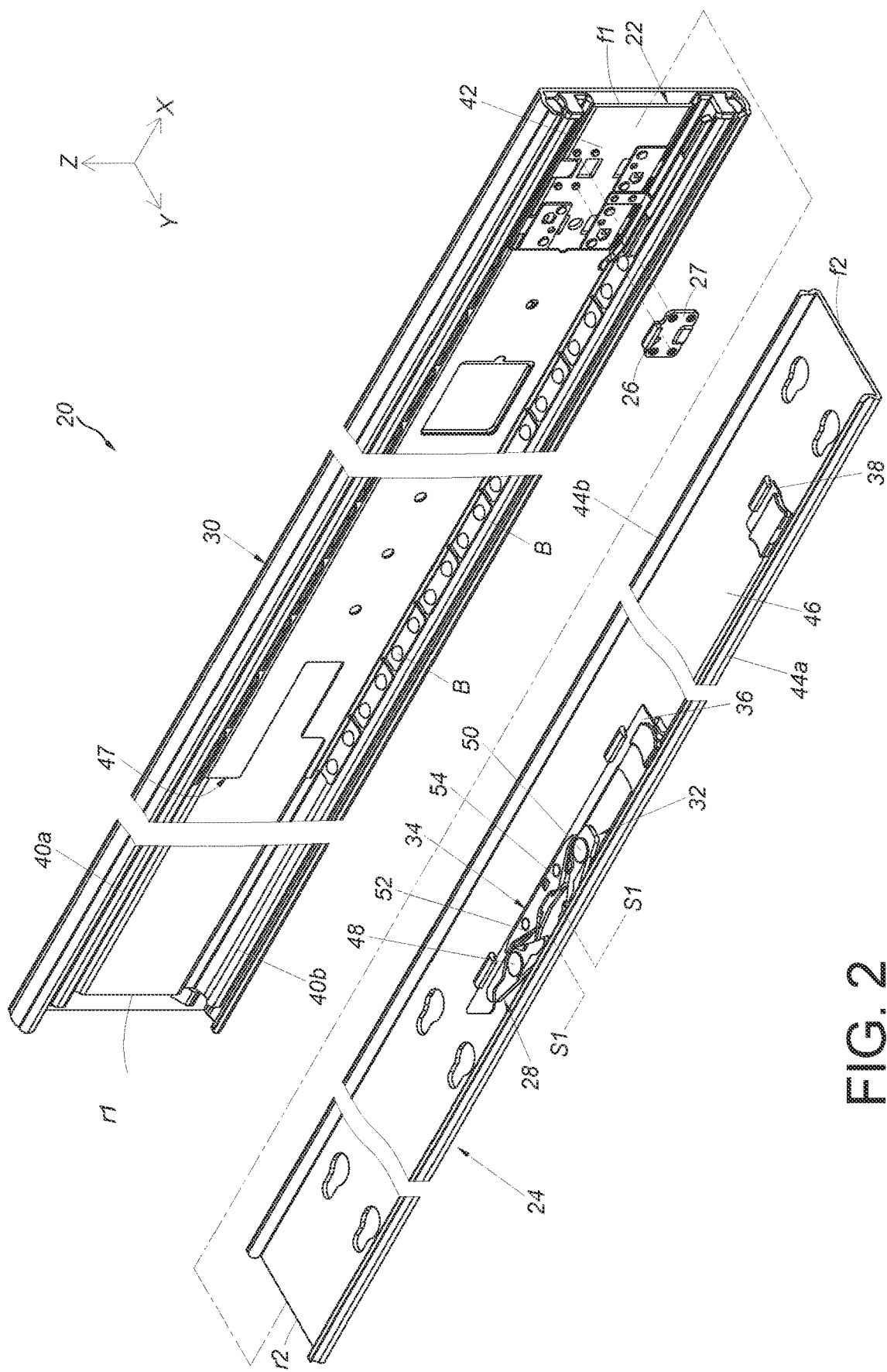
FIG. 2 is an exploded perspective view of the slide rail assembly according to the embodiment of the present invention.

Referring to FIG. 1 and FIG. 2, the slide rail assembly 20 according to an embodiment of the present invention includes a first rail 22, a second rail 24, a blocking feature 26, and a first component 28. Preferably, the slide rail assembly 20 further includes a third rail 30, and the first rail 22 is movably mounted between the third rail 30 and the second rail 24 such that the third rail 30 (e.g., an outer rail), the first rail 22 (e.g., an intermediate rail), and the second rail 24 (e.g., an inner rail) constitute a so-called three-section slide rail assembly 20. The first rail 22, the second rail 24, and the third rail 30 can be longitudinally displaced with respect to one another. In FIG. 1, the slide rail assembly 20 is in a retracted state in which the second rail 24 is at a retracted position R with respect to the first rail 22 (and the third rail 30). It is worth mentioning that in this embodiment the X-axis direction is defined as the longitudinal direction (or the length direction or displacement direction of the slide rails), the Y-axis direction as the transverse direction (or the lateral direction of the slide rails), and the Z-axis direction as the vertical direction (or the height direction of the slide rails).

Preferably, the slide rail assembly 20 further includes a second component 32, an elastic member 34, and at least one operation member such as but not limited to a first operation member 36 and a second operation member 38.

The third rail 30 includes a plurality of walls that define a channel for receiving the first rail 22. The first rail 22 includes a first wall 40a, a second wall 40b, and a longitudinal wall 42 connected between the first wall 40a and the second wall 40b of the first rail 22. The first wall 40a, the second wall 40b, and the longitudinal wall 42 of the first rail 22 jointly define another channel, which serves to receive the second rail 24. The first rail 22 has a first end f1 and a second end r1 located away from the first end f1, such as but not limited to a front end and a rear end.

The blocking feature 26 is provided at one of the first rail 22 and the second rail 24. Here, the blocking feature 26 is provided on the longitudinal wall 42 of the first rail 22 and is adjacent to the first end f1 of the first rail 22 by way of example only. The blocking feature 26 may be connected to the longitudinal wall 42 of the first rail 22 via a connecting portion 27, or the blocking feature 26 may be formed directly on the first rail 22; the present invention has no limitation in this regard.

The first rail 22 and the second rail 24 can be longitudinally displaced with respect to each other. The second rail 24 includes a first wall 44a, a second wall 44b, and a longitudinal wall 46 connected between the first wall 44a and the second wall 44b of the second rail 24. The second rail 24 has a first end f2 and a second end r2 located away from the first end f2, such as but not limited to a front end and a rear end.

Preferably, a slide facilitating device is provided between each two adjacent slide rails to help increase the smoothness with which the two slide rails can be longitudinally displaced with respect to each other. For example, a slide facilitating device 47 is movably provided between the second rail 24 and the first rail 22, and the slide facilitating device 47 includes a plurality of rolling balls B that are supported between the first wall 40a of the first rail 22 and the first wall 44a of the second rail 24 and between the second wall 40b of the first rail 22 and the second wall 44b of the second rail 24.

The first component 28 and the second component 32 are provided on the other of the first rail 22 and the second rail 24. Here, the first component 28 and the second component 32 are provided on the second rail 24 by way of example. Preferably, the first component 28 and the second component 32 are movably mounted on the longitudinal wall 46 of the second rail 24.

Preferably, the elastic member 34, the first operation member 36, and the second operation member 38 are all provided on the longitudinal wall 46 of the second rail 24.

Preferably, the elastic member 34 includes an elastic section for applying an elastic force to at least one of the first component 28 and the second component 32 and thereby keeping the at least one of the first component 28 and the second component 32 in a first state S 1. Here, by way of example, the elastic member 34 includes a first elastic portion 52 and a second elastic portion 54 for applying an elastic force to the first component 28 and the second component 32 respectively and thereby keeping the first component 28 and the second component 32 in the first state S1.

Preferably, the first operation member 36 and the second operation member 38 are configured to drive the first component 28 and the second component 32 out of the first state S1 respectively.

Figure 3:
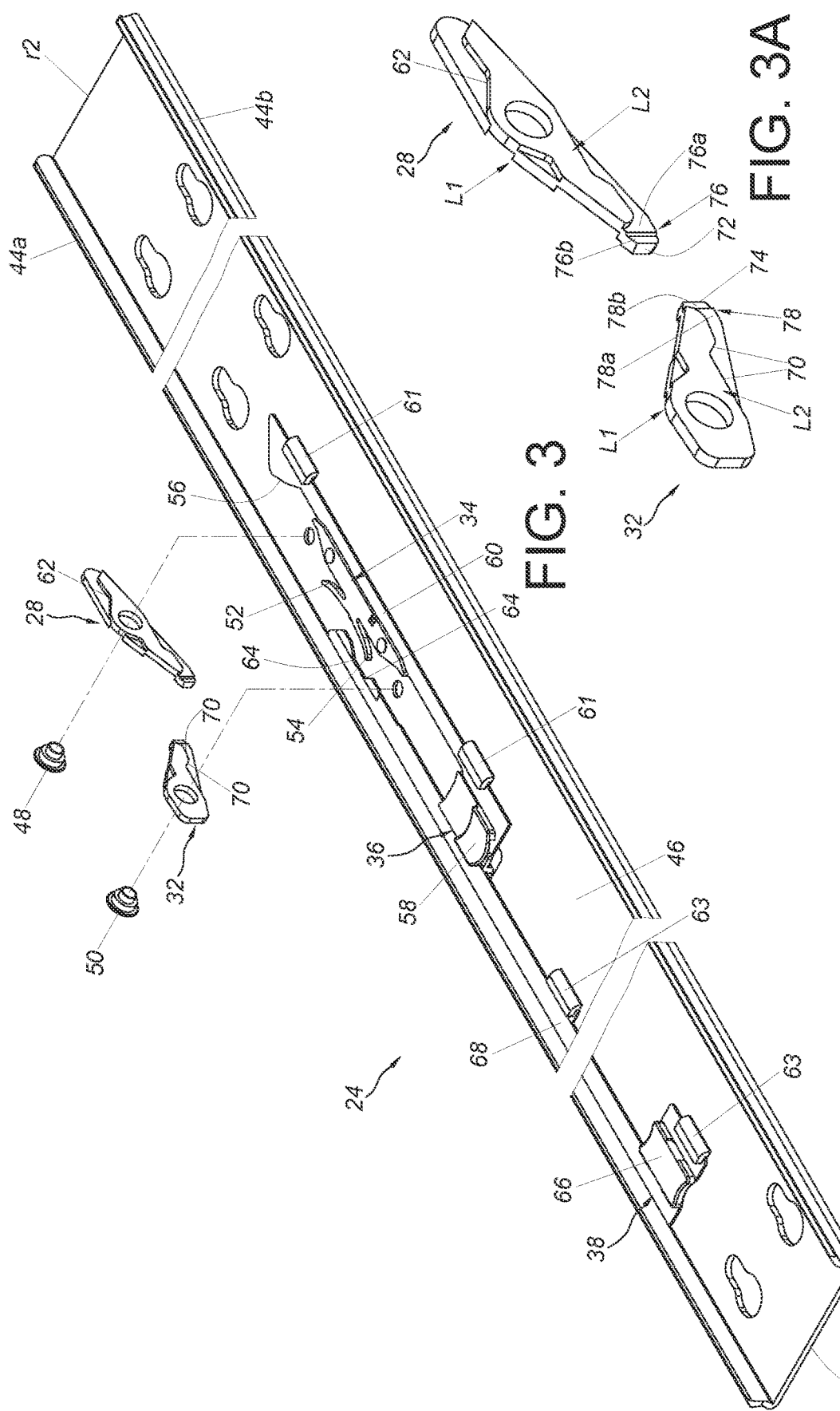
FIG. 3 is an exploded perspective view of the second rail and the two components on the second rail according to the embodiment of the present invention.
Figure 4:
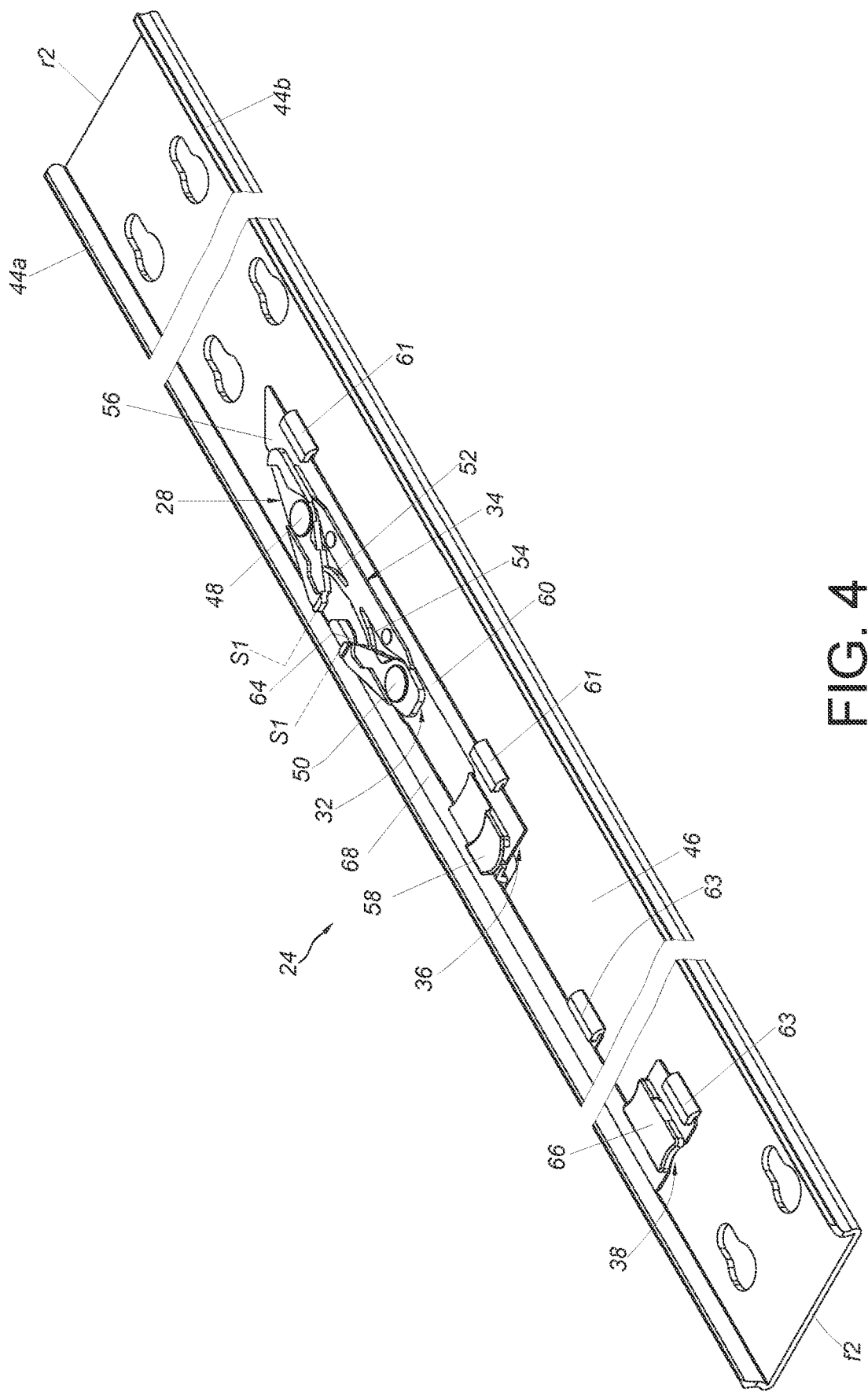
FIG. 4 is a perspective view of the second rail of the slide rail assembly according to the embodiment of the present invention.
Figure 5:
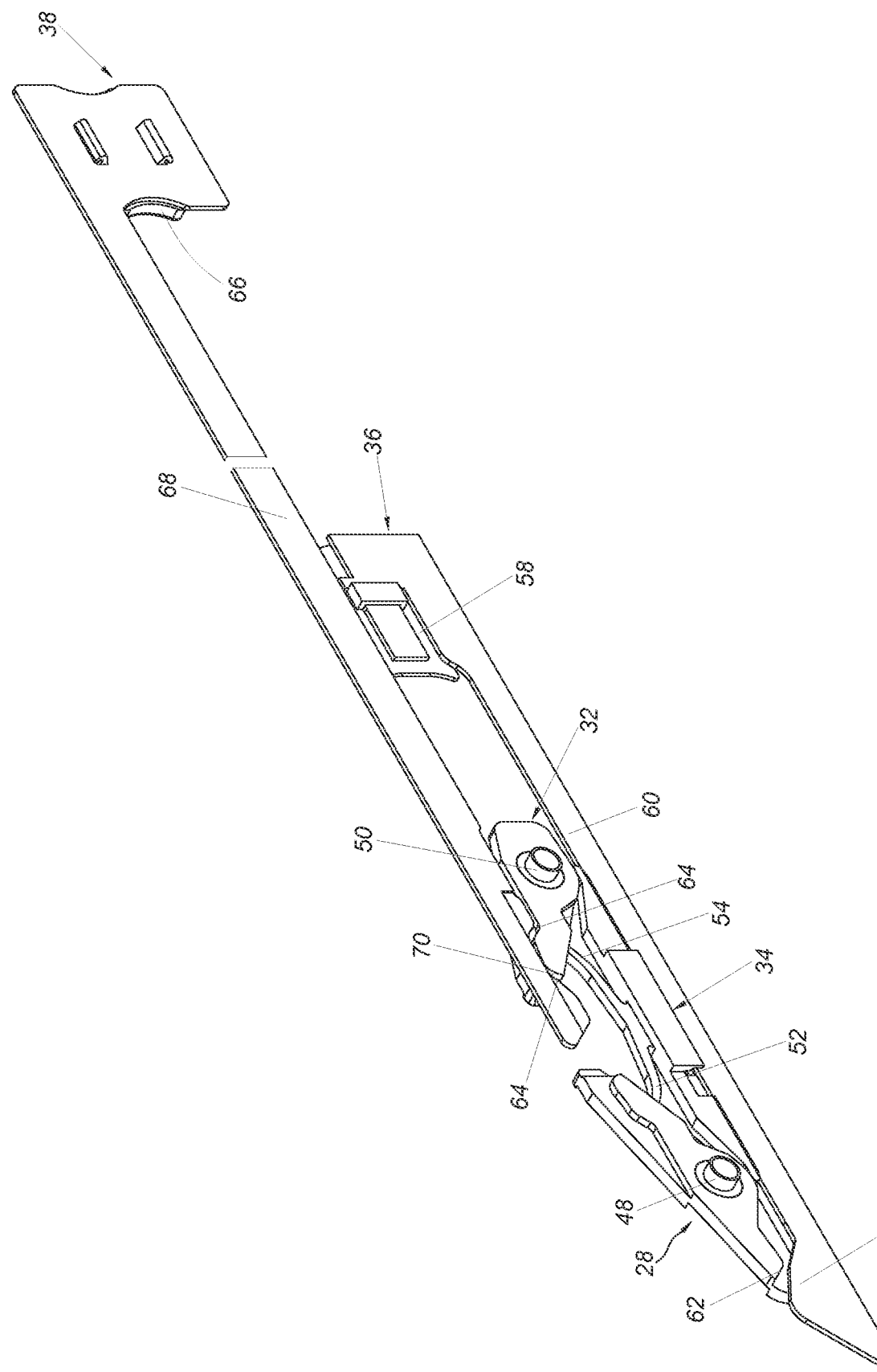
FIG. 5 is a perspective view showing the two components of the slide rail assembly according to the embodiment of the present invention in conjunction with the two operation members and the elastic member for use with the two components.

As shown in FIG. 3 to FIG. 5, the first component 28 and the second component 32 are pivotally connected to the longitudinal wall 46 of the second rail 24 via a first shaft 48 and a second shaft 50 respectively.

Preferably, the first operation member 36 is adjacent to a middle rail section of the second rail 24, and the second operation member 38 is adjacent to a front rail section at the first end f2 of the second rail 24.

Preferably, the first component 28 and the second component 32 are pressed against the first wall 44a of the second rail 24 when in the first state S1 (see FIG. 4).

Preferably, the first operation member 36 includes a first driving portion 56, a first operating portion 58, and a first longitudinal extension portion 60 connected between the first driving portion 56 and the first operating portion 58, wherein the first driving portion 56 is configured to match a first actuating portion 62 of the first component 28. Similarly, the second operation member 38 includes a second driving portion 64, a second operating portion 66, and a second longitudinal extension portion 68 connected between the second driving portion 64 and the second operating portion 66, wherein the second driving portion 64 is configured to match a second actuating portion 70 of the second component 32, and wherein the second operating portion 66 is adjacent to the first end f2 of the second rail 24 (see FIG. 3, FIG. 3A, and FIG. 5). Preferably, the second driving portion 64 has a front driving part and a rear driving part, and the second actuating portion 70 has two contact parts so that the second driving portion 64 can drive the second actuating portion 70 into displacement whether the second driving portion 64 is displaced forward or rearward.

Preferably, the second rail 24 is further provided with at least one first retaining portion 61 for supporting the first operation member 36 and at least one second retaining portion 63 for supporting the second operation member 38 (see FIG. 4).

Preferably, the first component 28 has a first predetermined portion 72, and the second component 32 has a second predetermined portion 74.

Preferably, each of the first component 28 and the second component 32 has two opposite sides defined respectively as a first side L1 and a second side L2 (see FIG. 3A). A first stepped structure 76 is provided between the first side L1 and the second side L2 of the first component 28. The first stepped structure 76 has a first step 76a and a second step 76b connected to the first step 76a, and the first predetermined portion 72 of the first component 28 is located at the second step 76b Similarly, a second stepped structure 78 is provided between the first side L1 and the second side L2 of the second component 32. The second stepped structure 78 has a first step 78a and a second step 78b connected to the first step 78a, and the second predetermined portion 74 of the second component 32 is located at the second step 78b.

Figure 6:
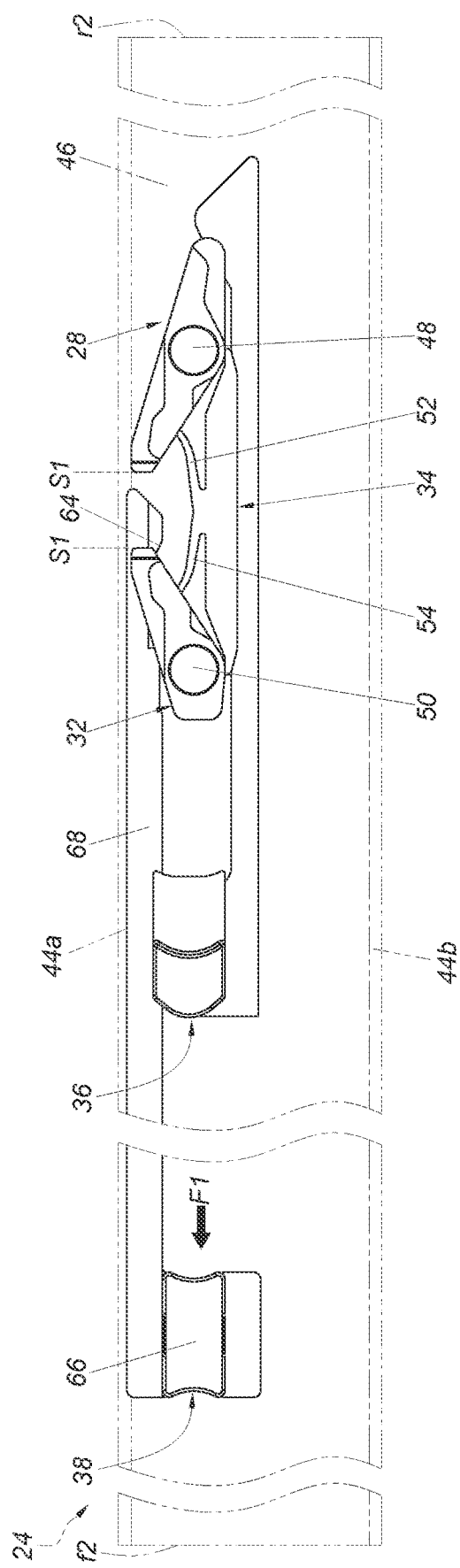
FIG. 6 is a schematic view showing that the two components on the second rail are not operated and are therefore in a first state according to the embodiment of the present invention.
Figure 7:
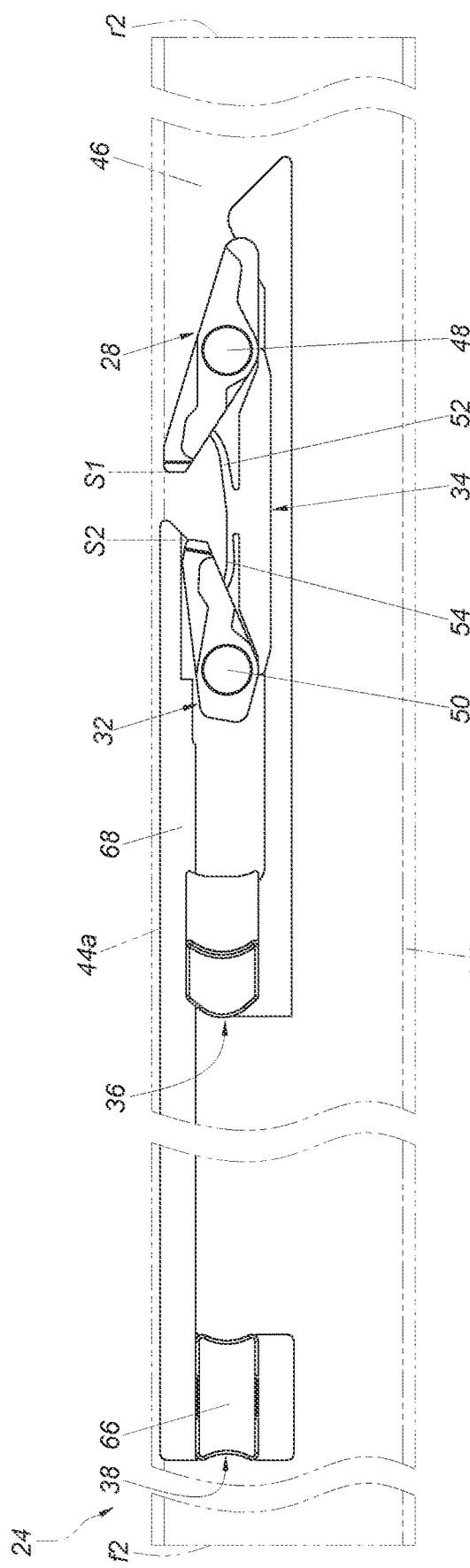
FIG. 7 is a schematic view showing that one of the two components on the second rail has been operated and is now in a second state according to the embodiment of the present invention.
Figure 10:
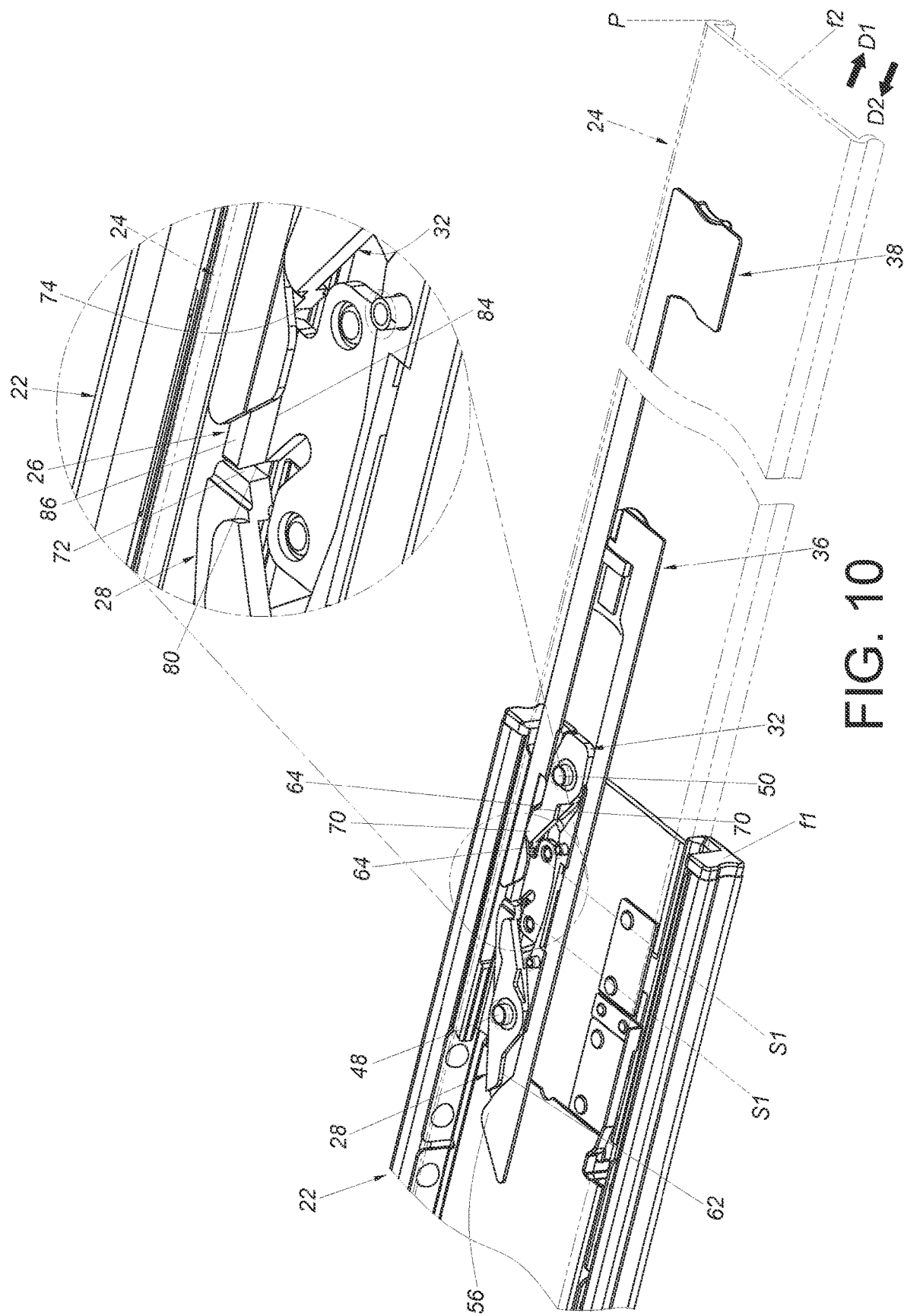
FIG. 10 is a schematic view from a first viewing angle showing that the second rail of the slide rail assembly according to the embodiment of the present invention is at a predetermined position with respect to the first rail.
Figure 11:
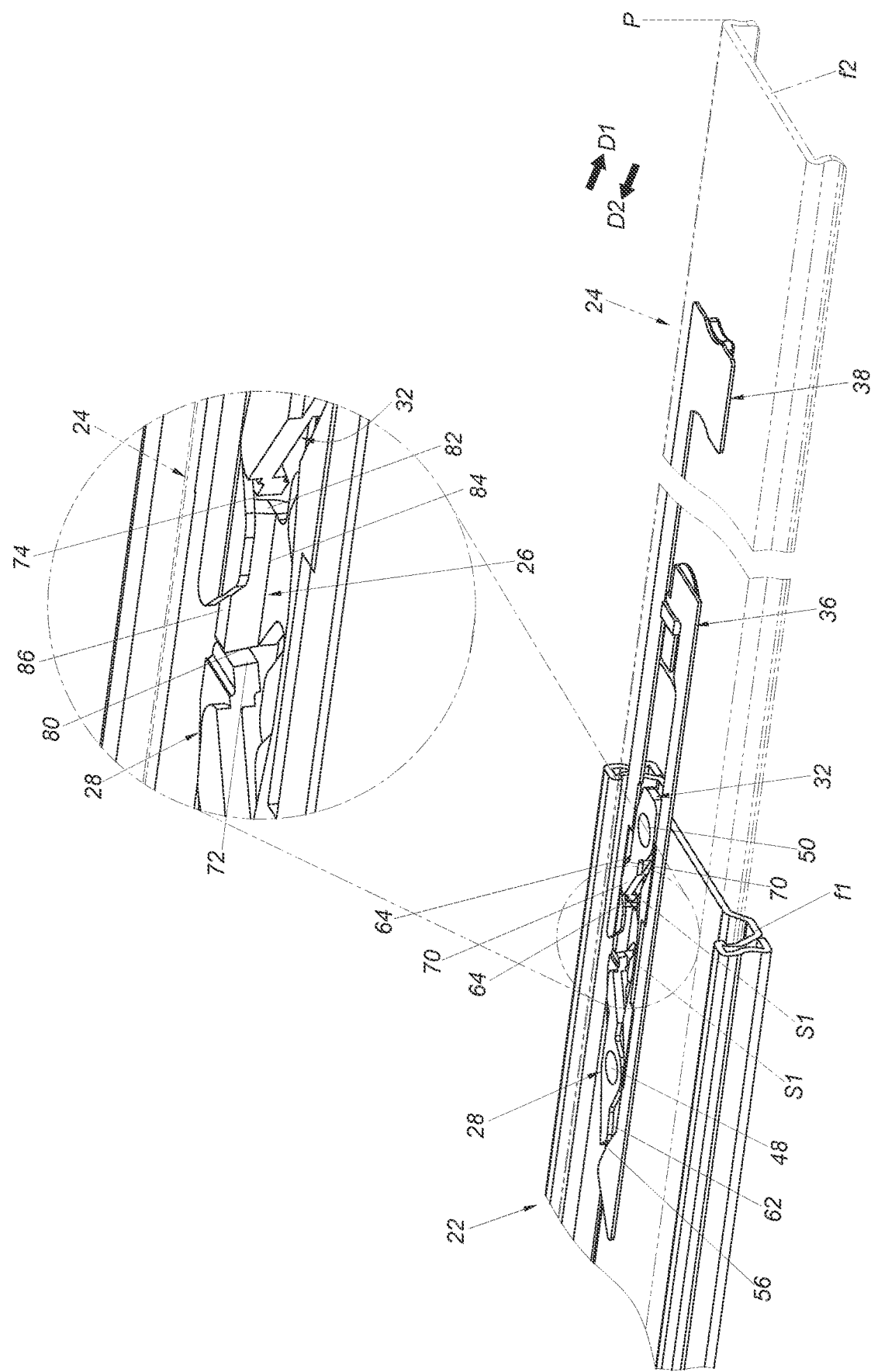
FIG. 11 is a schematic view from a second viewing angle showing that the second rail of the slide rail assembly according to the embodiment of the present invention is at the predetermined position with respect to the first rail.

Referring to FIG. 6 and FIG. 7, the first component 28 and the second component 32 are pressed against the first wall 44a of the second rail 24 by the elastic force of the first elastic portion 52 and of the second elastic portion 54 respectively (see FIG. 6).

A user may apply a first force F1 to the second operation member 38 (or more particularly to its second operating portion 66) so that the second operation member 38 is longitudinally displaced with respect to the second rail 24 (see FIG. 7). With the second driving portion 64 and the second actuating portion 70 working together, the second component 32 will be driven into motion (e.g., pivotal movement) and thus enter a second state S2 (as shown in FIG. 7) from the first state S1 (as shown in FIG. 6). When the second component 32 is in the second state S2, it is no longer pressed against the first wall 44a of the second rail 24, and the second elastic portion 54 is in an elastic force accumulating state. Once the user stops applying the first force F1, the second component 32 will return from the second state S2 to the first state S1 in response to the second elastic portion 54 releasing the accumulated elastic force.

Referring to FIG. 8 and FIG. 9, the user may apply a second force F2 to the first operation member 36 (or more particularly to its first operating portion 58) so that the first operation member 36 is longitudinally displaced with respect to the second rail 24 (see FIG. 9). With the first driving portion 56 and the first actuating portion 62 working together, the first component 28 will be driven into motion (e.g., pivotal movement) and thus enter the second state S2 (as shown in FIG. 9) from the first state S1 (as shown in FIG. 8). When the first component 28 is in the second state S2, it is no longer pressed against the first wall 44a of the second rail 24, and the first elastic portion 52 is in an elastic force accumulating state. Once the user stops applying the second force F2, the first component 28 will return from the second state S2 to the first state S1 in response to the first elastic portion 52 releasing the accumulated elastic force.

It is worth mentioning that while the first operation member 36 and the second operation member 38 are described herein as configured to drive the first component 28 and the second component 32 respectively from the first state S1 to the second state S2, an alternative embodiment may include only one operation member, which has two driving portions for driving the first component 28 and the second component 32 respectively from the first state S1 to the second state S2. In practice, there is no limitation on the number of the operation members.

Referring to FIG. 10 to FIG. 14, the blocking feature 26 has a first blocking portion 80 and preferably also a second blocking portion 82. The first blocking portion 80 and the second blocking portion 82 are located at two ends (e.g., two opposite ends) of the blocking feature 26 respectively. Here, by way of example, the first blocking portion 80 and the second blocking portion 82 are located at a rear end and a front end of the blocking feature 26 respectively.

When the second rail 24 is at a predetermined position P (such as but not limited to an extended position) with respect to the first rail 22, the first blocking portion 80 of the blocking feature 26 and the first predetermined portion 72 of the first component 28 are blocked by each other to prevent the second rail 24 from being displaced with respect to the first rail 22 from the predetermined position P in a first direction D 1. Preferably, the second blocking portion 82 of the blocking feature 26 and the second predetermined portion 74 of the second component 32 are also blocked by each other to prevent the second rail 24 from being displaced with respect to the first rail 22 from the predetermined position P in a second direction D2, which is the opposite direction of the first direction D1. For example, the first direction D1 may be, but is not limited to, the opening direction, and the second direction D2 may be, but is not limited to, the retracting direction.

When the second rail 24 is at the predetermined position P with respect to the first rail 22, it is preferable that both the first component 28 and the second component 32 are in the first state S1, and that the first predetermined portion 72 of the first component 28 and the second predetermined portion 74 of the second component 32 are respectively blocked by the first blocking portion 80 and the second blocking portion 82 of the blocking feature 26 to prevent the second rail 24 from being displaced with respect to the first rail 22 from the predetermined position P in the second direction D2 as well as in the first direction D1.

More specifically, the blocking feature 26 has a low section 84 and a high section 86 in the Y-axis direction (i.e., in the transverse direction or in the lateral direction of the slide rails). The high section 86 has a first longitudinal length M1 that is substantially greater than a second longitudinal length M2 of the low section 84 (see FIG. 12 and FIG. 13) such that a first engaging space 85 is formed, with the first blocking portion 80 of the blocking feature 26 forming a first non-vertical structure in the Y-axis direction (i.e., in the transverse direction or in the lateral direction of the slide rails). The first predetermined portion 72 of the first component 28 enters the first engaging space 85 when the second rail 24 arrives at the predetermined position P with respect to the first rail 22; as a result, the first blocking portion 80 of the blocking feature 26 and the first predetermined portion 72 of the first component 28 are blocked by each other in the Y-axis direction (i.e., in the transverse direction or in the lateral direction of the slide rails). This either ensures that the second rail 24 cannot be easily moved away from the predetermined position P in the first direction D1 with respect to the first rail 22, or helps enhance the reliability of the mutual blockage between the first blocking portion 80 of the blocking feature 26 and the first predetermined portion 72 of the first component 28.

Preferably, the first blocking portion 80 of the blocking feature 26 lies between the low section 84 and the high section 86, and the high section 86 and the low section 84 are so arranged that the first blocking portion 80 has a first inclination angle K1 (see FIG. 12 and FIG. 13) and thereby forms the first non-vertical structure.

Similarly, the blocking feature 26 has a second engaging space 87, and the second blocking portion 82 forms a second non-vertical structure. The second predetermined portion 74 of the second component 32 enters the second engaging space 87 when the second rail 24 arrives at the predetermined position P with respect to the first rail 22; as a result, the second blocking portion 82 of the blocking feature 26 and the second predetermined portion 74 of the second component 32 are blocked by each other in the Y-axis direction (i.e., in the transverse direction or in the lateral direction of the slide rails). This either ensures that the second rail 24 cannot be moved away from the predetermined position P in the second direction D2 with respect to the first rail 22, or helps enhance the reliability of the mutual blockage between the second blocking portion 82 of the blocking feature 26 and the second predetermined portion 74 of the second component 32. In other words, the second rail 24 in this state cannot be moved back to the retracted position R from the predetermined position P in the second direction D2.

Preferably, the second blocking portion 82 lies between the low section 84 and the high section 86, and the high section 86 and the low section 84 are so arranged that the second blocking portion 82 has a second inclination angle K2 (see FIG. 12 and FIG. 13) and thereby forms the second non-vertical structure.

Figure 12:
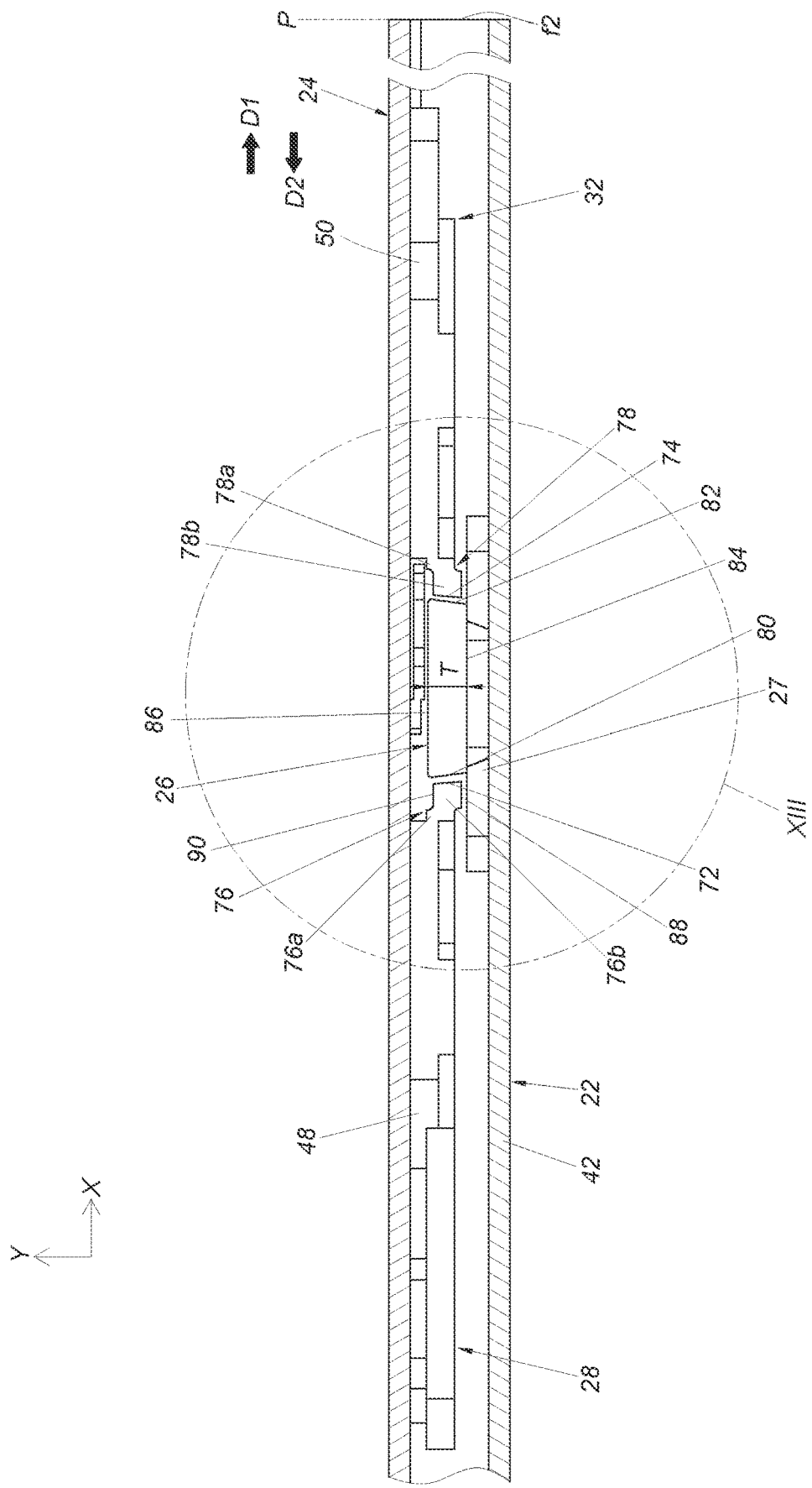
FIG. 12 is a schematic view from a third viewing angle showing that the second rail of the slide rail assembly according to the embodiment of the present invention is at the predetermined position with respect to the first rail.
Figure 13:
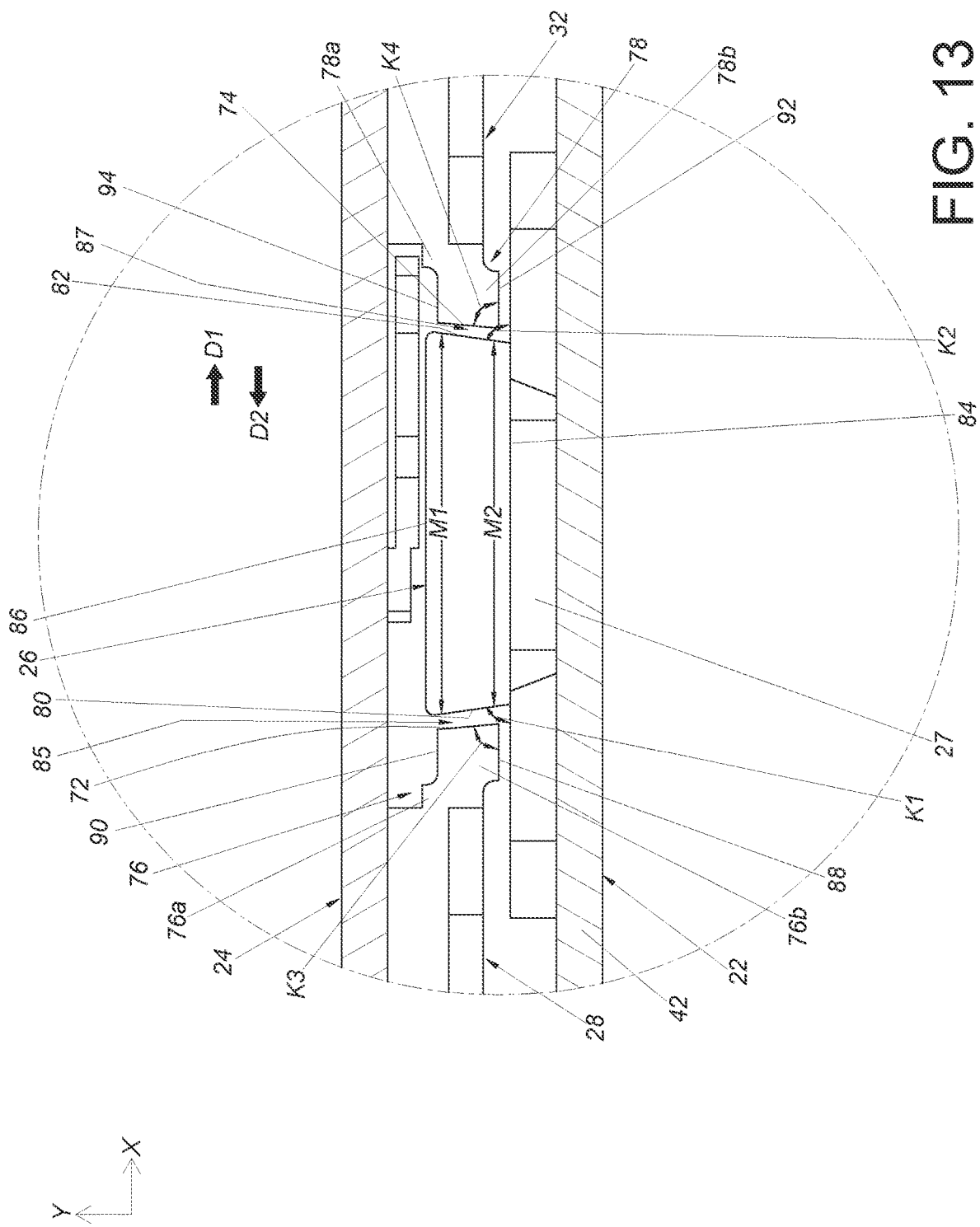
FIG. 13 is an enlarged view of the circled area in FIG. 12.
Figure 14:
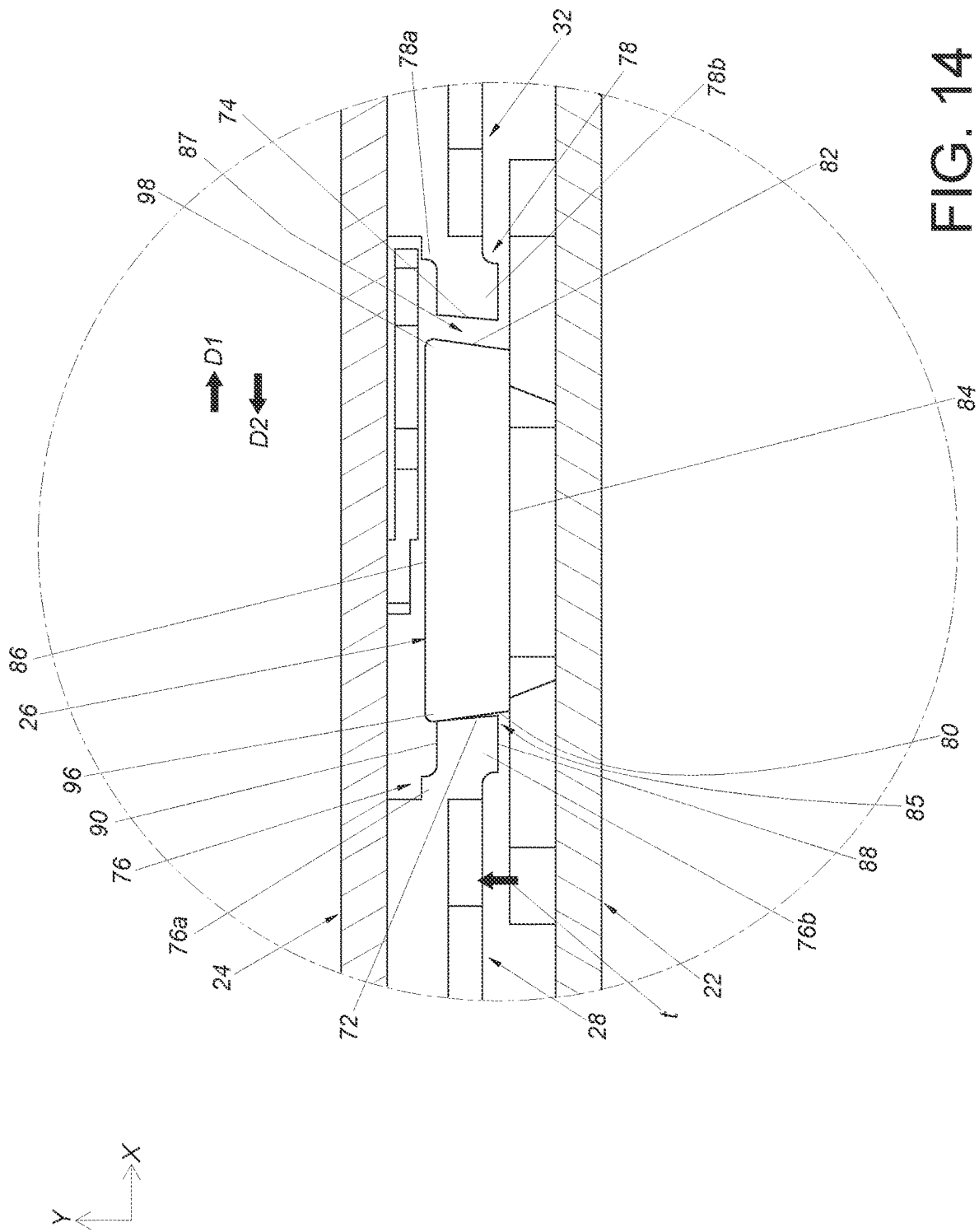
FIG. 14 is a schematic view showing that a non-vertical structure can ensure that the second rail cannot be easily moved away from the predetermined position with respect to the first rail in a predetermined direction when a blocking feature blocks and is blocked by one of the two components.

Preferably, the second inclination angle K2 is substantially the same as the first inclination angle K1 (see FIG. 12 and FIG. 13).

Preferably, the blocking feature 26 protrudes with respect to the longitudinal wall 42 of the first rail 22 substantially in the Y-axis direction (i.e., in the transverse direction) such that the high section 86 of the blocking feature 26 has a transverse height T with respect to the low section 84 (see FIG. 12).

Preferably, the second step 76b of the first stepped structure 76 of the first component 28 has a low portion 88 and a high portion 90, the first predetermined portion 72 lies between the low portion 88 and the high portion 90, and the high portion 90 and the low portion 88 are so arranged that the first predetermined portion 72 has a third inclination angle K3 and thereby forms another first non-vertical structure. When an external force (e.g., an impact force) acting in the first direction D1 is applied to the second rail 24 at the predetermined position P, referring to FIG. 14, the first predetermined portion 72 of the first component 28 may collide with the first blocking portion 80 of the blocking feature 26 such that the first component 28 is slightly moved or bent in the transverse direction t (i.e., in the Y-axis direction). To prevent this unwanted movement or bending, the present embodiment is such that at least the first blocking portion 80 of the blocking feature 26 forms the first non-vertical structure, or that the first predetermined portion 72 of the first component 28 as well as the first blocking portion 80 of the blocking feature 26 forms the first non-vertical structure. For example, the first blocking portion 80 of the blocking feature 26 forms the first non-vertical structure in such a way that the high section 86 of the first blocking portion 80 of the blocking feature 26 has a first shoulder 96 with respect to the low section 84, and the first shoulder 96 can prevent or block the first component 28 from moving in the transverse direction t, lest the first predetermined portion 72 and the first blocking portion 80 separate from each other in the transverse direction. When the first blocking portion 80 of the blocking feature 26 blocks and is blocked by the first predetermined portion 72 of the first component 28, therefore, the first shoulder 96 either ensures that the second rail 24 cannot be easily moved away from the predetermined position P in the first direction D1 with respect to the first rail 22, or helps enhance the reliability of the mutual blockage between the first blocking portion 80 of the blocking feature 26 and the first predetermined portion 72 of the first component 28. Similarly, when an external force (e.g., an impact force) acting in the second direction D2 is applied to the second rail 24 at the predetermined position P, the second predetermined portion 74 of the second component 32 may collide with the second blocking portion 82 of the blocking feature 26 such that the second component 32 is slightly moved or bent in the transverse direction t. To prevent this unwanted movement or bending, either the second blocking portion 82 of the blocking feature 26 forms the second non-vertical structure, or the second predetermined portion 74 of the second component 32 as well as the second blocking portion 82 of the blocking feature 26 forms the second non-vertical structure. For example, the high section 86 of the second blocking portion 82 of the blocking feature 26 has a second shoulder 98 with respect to the low section 84, and the second shoulder 98 can prevent or block the second component 32 from moving in the transverse direction t, lest the second predetermined portion 74 and the second blocking portion 82 separate from each other in the transverse direction t. When the second blocking portion 82 of the blocking feature 26 blocks and is blocked by the second predetermined portion 74 of the second component 32, therefore, the second shoulder 98 either ensures that the second rail 24 cannot be easily moved away from the predetermined position P in the second direction D2 with respect to the first rail 22, or helps enhance the reliability of the mutual blockage between the second blocking portion 82 of the blocking feature 26 and the second predetermined portion 74 of the second component 32. For the sake of brevity, no further description is provided in this respect.

Preferably, the low portion 88 and the high portion 90 of the second step 76b define a transverse thickness therebetween, and the transverse thickness is smaller than the transverse height T (see FIG. 12). This configuration allows the second step 76b (i.e., the first predetermined portion 72 of the first component 28) to be within the extent of the transverse height T of the blocking feature 26 so as to increase the reliability of the mutual blockage between the first blocking portion 80 of the blocking feature 26 and the first predetermined portion 72 of the first component 28, ensuring that the second rail 24 cannot be displaced in the first direction D1 when at the predetermined position P with respect to the first rail 22.

Similarly, the second step 78b of the second stepped structure 78 of the second component 32 has a low portion 92 and a high portion 94. The second predetermined portion 74 lies between the low portion 92 and the high portion 94, and the high portion 94 and the low portion 92 are so arranged that the second predetermined portion 74 has a fourth inclination angle K4 and thereby forms another second non-vertical structure. The low portion 92 and the high portion 94 of the second step 78b also define a transverse thickness therebetween, and this transverse thickness is smaller than the transverse height T (see FIG. 12) too. This configuration allows the second step 78b (i.e., the second predetermined portion 74 of the second component 32) to be within the extent of the transverse height T of the blocking feature 26 so as to increase the reliability of the mutual blockage between the second blocking portion 82 of the blocking feature 26 and the second predetermined portion 74 of the second component 32, ensuring that the second rail 24 cannot be displaced in the second direction D2 when at the predetermined position P with respect to the first rail 22.

It is worth mentioning that once the first component 28 is operated and thereby brought into the second state S2 as shown in FIG. 9, the first predetermined portion 72 of the first component 28 is no longer blocked by the first blocking portion 80 of the blocking feature 26 and therefore allows the second rail 24 to be displaced with respect to the first rail 22 from the predetermined position P in the first direction D1 in order to be detached or separated from the channel of the first rail 22. Or, once the second component 32 is operated and thereby brought into the second state S2 as shown in FIG. 7, the second predetermined portion 74 of the second component 32 is no longer blocked by the second blocking portion 82 of the blocking feature 26 and therefore allows the second rail 24 to be displaced with respect to the first rail 22 from the predetermined position P to the retracted position R (see FIG. 1) in the second direction D2. It should be further noted that instead of having an inclined configuration, the first non-vertical structure of the first blocking portion 80 or the second non-vertical structure of the second blocking portion 82 may, for example, have a protruding blocking portion or other similar structure adjacent to the high section 86 of the blocking feature 26. This alternative configuration is equally capable of effecting mutual blockage between the second blocking portion 82 of the blocking feature 26 and the second predetermined portion 74 of the second component 32 in the Y-axis direction (i.e., in the transverse direction or in the lateral direction of the slide rails) when the second rail 24 is at the predetermined position P with respect to the first rail 22.

It can be known from the above that the slide rail assembly 20 according to the foregoing embodiment preferably has the following features:

1. A blocking portion (e.g., the first blocking portion 80 or the second blocking portion 82) of the blocking feature 26 forms a non-vertical structure, and so does the predetermined portion (e.g., the first predetermined portion 72 or the second predetermined portion 74) of the corresponding component (e.g., the first component 28 or the second component 32) (for example, the blocking portion of the blocking feature 26 has an inclination angle, and so does the predetermined portion of the corresponding component). The non-vertical structures ensure that when the blocking portion of the blocking feature 26 blocks and is blocked by the predetermined portion of the corresponding component in the first state S1, the second rail 24 cannot be moved away from the predetermined position P with respect to the first rail 22 in a certain direction (e.g., the first direction D1 or the second direction D2). The reliability or safety of use of the slide rail assembly 20 is thus enhanced.

2. When the second rail 24 is at the predetermined position P with respect to the first rail 22, a blocking portion (e.g., the first blocking portion 80 or the second blocking portion 82) of the blocking feature 26 blocks and is blocked by the predetermined portion of the corresponding component (e.g., the first component 28 or the second component 32), thereby preventing the second rail 24 from being displaced with respect to the first rail 22 from the predetermined position P in a certain direction. The blocking feature 26 protrudes with respect to the longitudinal wall 42 of the first rail 22 substantially in the transverse direction such that the high section 86 of the blocking feature 26 has a transverse height T with respect to the low section 84. A stepped structure is provided between the first side L1 and the second side L2 of the corresponding component and has a first step and a second step connected to the first step. The predetermined portion (e.g., the first predetermined portion 72 or the second predetermined portion 74) of the corresponding component is located at the second step, and the low portion 88 and the high portion 90 of the second step define therebetween a transverse thickness smaller than the transverse height T.

While the present invention has been disclosed through the embodiment described above, it should be understood that the embodiment is not intended to be restrictive of the scope of the invention. The scope of the patent protection sought by the applicant is defined by the appended claims.

What is claimed is:

1. A slide rail assembly, comprising:
   a first rail;
   a second rail, wherein the second rail and the first rail are displaceable with respect to each other in a longitudinal direction;
   a blocking feature provided at one of the first rail and the second rail; and
   a first component provided at the other of the first rail and the second rail;
   wherein when the second rail is at a predetermined position with respect to the first rail, a first blocking portion of the blocking feature and a first predetermined portion of the first component are blocked by each other in the longitudinal direction to prevent the second rail from displacement with respect to the first rail from the predetermined position in a first direction;
   wherein the first blocking portion of the blocking feature forms a first non-vertical structure in a transverse direction, the blocking feature has a high section and a low section, the high section has a first longitudinal length substantially greater than a second longitudinal length of the low section such that a first engaging space is formed, and when the second rail reaches the predetermined position with respect to the first rail, the first predetermined portion of the first component enters the first engaging space such that the first blocking portion of the blocking feature and the first predetermined portion of the first component are blocked by each other in the transverse direction; and wherein the first blocking portion is located between the low section and the high section, and the high section and the low section are so arranged that the first blocking portion has a first inclination angle and forms the first non-vertical structure.

2. The slide rail assembly of claim 1, wherein the blocking feature further has a second blocking portion and forms a second engaging space, the second blocking portion forms a second non-vertical structure, and the second blocking portion and the first blocking portion are located at two ends of the blocking feature respectively.

3. The slide rail assembly of claim 2, wherein the second blocking portion is located between the low section and the high section, and the high section and the low section are so arranged that the second blocking portion has a second inclination angle and forms the second non-vertical structure.

4. The slide rail assembly of claim 3, wherein the second inclination angle and the first inclination angle are substantially the same.

5. The slide rail assembly of claim 4, wherein the one of the first rail and the second rail includes a first wall, a second wall, and a longitudinal wall connected between the first wall and the second wall, and the blocking feature protrudes with respect to the longitudinal wall substantially in the transverse direction such that the high section of the blocking feature has a transverse height with respect to the low section.

6. The slide rail assembly of claim 5, wherein the first component has two opposite sides defined respectively as a first side and a second side, with a first stepped structure provided between the first side and the second side of the first component, the first stepped structure has a first step and a second step connected to the first step of the first stepped structure, the first predetermined portion of the first component is located at the second step of the first stepped structure, the second step of the first stepped structure has a low portion and a high portion, the first predetermined portion is located between the low portion and the high portion of the second step of the first stepped structure, and the high portion and the low portion of the second step of the first stepped structure are so arranged that the first predetermined portion has a third inclination angle and forms another said first non-vertical structure.

7. The slide rail assembly of claim 6, wherein the low portion and the high portion of the second step define therebetween a transverse thickness smaller than the transverse height.

8. The slide rail assembly of claim 6, further comprising a second component provided at the other of the first rail and the second rail, wherein when the second rail is at the predetermined position with respect to the first rail, the second blocking portion of the blocking feature and a second predetermined portion of the second component are blocked by each other in the longitudinal direction to prevent the second rail from displacement with respect to the first rail from the predetermined position in a second direction, which is the opposite direction of the first direction, and when the second rail reaches the predetermined position with respect to the first rail, the second predetermined portion of the second component enters the second engaging space such that the second blocking portion of the blocking feature and the second predetermined portion of the second component are blocked by each other in the transverse direction.

9. The slide rail assembly of claim 8, wherein the second component has two opposite sides defined respectively as a first side and a second side, with a second stepped structure provided between the first side and the second side of the second component, the second stepped structure has a first step and a second step connected to the first step of the second stepped structure, the second predetermined portion of the second component is located at the second step of the second stepped structure, the second step of the second stepped structure has a low portion and a high portion, the second predetermined portion is located between the low portion and the high portion of the second step of the second stepped structure, and the high portion and the low portion of the second step of the second stepped structure are so arranged that the second predetermined portion has a fourth inclination angle and forms another said second non-vertical structure.

10. The slide rail assembly of claim 9, wherein the first component is movably mounted on the other of the first rail and the second rail.

11. The slide rail assembly of claim 10, wherein the second component is movably mounted on the other of the first rail and the second rail.

12. The slide rail assembly of claim 11, wherein when the first component and the second component are in a first state, the first predetermined portion of the first component and the second predetermined portion of the second component are respectively blocked by the first blocking portion and the second blocking portion of the blocking feature to prevent the second rail from displacement with respect to the first rail from the predetermined position in the second direction as well as in the first direction.

13. The slide rail assembly of claim 12, wherein once the first component and the second component are operated and thereby brought into a second state, the first predetermined portion of the first component and the second predetermined portion of the second component are no longer respectively blocked by the first blocking portion and the second blocking portion of the blocking feature, thus allowing the second rail to be displaced with respect to the first rail from the predetermined position in the second direction as well as in the first direction.

14. The slide rail assembly of claim 13, further comprising an elastic member and at least one operation member, wherein the elastic member includes an elastic section for applying an elastic force to one of the first component and the second component and thereby keeping the one of the first component and the second component in the first state, and the at least one operation member is configured to drive the one of the first component and the second component into motion and thereby bring the one of the first component and the second component from the first state into the second state.

15. The slide rail assembly of claim 14, wherein the at least one operation member includes a first operation member and a second operation member, the first operation member is adjacent to a middle rail section of the second rail, and the second operation member is adjacent to a front rail section of the second rail.

16. The slide rail assembly of claim 15, wherein the first operation member includes a first driving portion, and the first driving portion is configured to match a first actuating portion of the first component; the second operation member includes a second driving portion, the second driving portion is configured to match a second actuating portion of the second component; the second driving portion has two driving parts defined respectively as a front driving part and a rear driving part, and the second actuating portion has two contact parts so that the second driving portion is able to drive the second actuating portion into displacement when displaced rearward as well as when displaced forward.

17. A slide rail assembly, comprising:
a first rail;
a second rail, wherein the second rail and the first rail are displaceable with respect to each other in a longitudinal direction;
a blocking feature provided at the first rail; and
a component provided at the second rail;
wherein when the second rail is at a predetermined position with respect to the first rail, a blocking portion of the blocking feature and a predetermined portion of the component are blocked by each other in the longitudinal direction to prevent the second rail from displacement with respect to the first rail from the predetermined position in a predetermined direction;
wherein each of the first rail and the second rail includes a first wall, a second wall, and a longitudinal wall connected between the first wall and the second wall, the blocking feature protrudes with respect to the longitudinal wall of the first rail substantially in a transverse direction such that a high section of the blocking feature has a transverse height with respect to a low section of the blocking feature, and the high section has a first longitudinal length substantially greater than a second longitudinal length of the low section;
wherein the component has two opposite sides defined respectively as a first side and a second side, with a stepped structure provided between the first side and the second side of the component, the stepped structure has a first step and a second step connected to the first step, and the predetermined portion of the component is located at the second step;
wherein a low portion and a high portion of the second step define therebetween a transverse thickness smaller than the transverse height.

18. The slide rail assembly of claim 17, wherein the blocking portion of the blocking feature forms a non-vertical structure in the transverse direction to help enhance reliability of said mutual blockage between the blocking portion of the blocking feature and the predetermined portion of the component.

19. The slide rail assembly of claim 18, wherein the blocking portion is located between the low section and the high section, and the high section and the low section are so arranged that the blocking portion has an inclination angle and forms the non-vertical structure.

* * * * *